United States Patent
Kurtz et al.

(10) Patent No.: US 8,631,709 B2
(45) Date of Patent: *Jan. 21, 2014

(54) PRESSURE TRANSDUCER STRUCTURES HAVING A PLURALITY OF CONDUCTIVE TRACES FOR CURVED SURFACES

(75) Inventors: Anthony D. Kurtz, Saddle River, NJ (US); Scott J. Goodman, Wayne, NJ (US); Alexander A. Ned, Kinnelon, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 69 days.

This patent is subject to a terminal disclaimer.

(21) Appl. No.: 13/291,578

(22) Filed: Nov. 8, 2011

(65) Prior Publication Data
US 2012/0048024 A1  Mar. 1, 2012

Related U.S. Application Data

(63) Continuation of application No. 12/291,870, filed on Nov. 14, 2008, now Pat. No. 8,069,730.

(51) Int. Cl.
*G01L 9/06* (2006.01)
(52) U.S. Cl.
USPC ............................ 73/727; 73/715; 361/283.4
(58) Field of Classification Search
None
See application file for complete search history.

(56) References Cited

U.S. PATENT DOCUMENTS

| 4,173,149 | A | * | 11/1979 | Critten et al. .................. 73/706 |
| 4,685,469 | A | | 8/1987 | Keller |
| 4,815,471 | A | | 3/1989 | Stobie |
| 5,438,880 | A | * | 8/1995 | Washburn ................. 73/861.65 |
| 6,134,485 | A | | 10/2000 | Tanielian |
| 6,201,467 | B1 | * | 3/2001 | Winterer et al. ............... 338/42 |
| 6,800,946 | B2 | | 10/2004 | Chason |

(Continued)

FOREIGN PATENT DOCUMENTS

EP          732501 A1  *  9/1996

OTHER PUBLICATIONS

Chunyan Li et al Polymer flip-chip bonding of pressure sensors on a flexible Kapton film for neonatal catheters; Jul. 21, 2005; Journal of Micromechanics and Microengineering.
Gui-Wei Xiao A pressure sensor using flip-chip on low-cost flexible substrate; May 29, 2001 Proceedings 51st Electronic Components and Technology Conference.

(Continued)

*Primary Examiner* — Lisa Caputo
*Assistant Examiner* — Jermaine Jenkins
(74) *Attorney, Agent, or Firm* — Troutman Sanders LLP; James E. Schutz

(57) ABSTRACT

A novel flexible transducer structure is suitable for attaching to curved surface such as the leading edge of an aircraft wing. The structure comprises a thin flexible sheet of an insulating material with a leadless transducer secured to the sheet. The sheet is then placed over the curved surface and assumes the curvature of the surface. The transducer secured to the sheet provides an output of pressure according the pressure exerted on the sheet. The sheet basically is fabricated from a thin material such as Kapton and is flexible so as to assume the curvature of the surface with the transducer being exposed to pressure applied to the curved surface. The sensor in conjunction with the flexible sheet allows pressure to be measured without disturbing the air flow patterns of the measuring surfaces and because of its construction, is moisture resistant over a large variety of atmospheric conditions.

20 Claims, 9 Drawing Sheets

(56) References Cited

U.S. PATENT DOCUMENTS

| | | |
|---|---|---|
| 7,021,147 B1 * | 4/2006 | Subramanian et al. ......... 73/708 |
| 7,127,948 B2 | 10/2006 | Tavares |
| 7,201,063 B2 * | 4/2007 | Taylor ............................ 73/841 |
| 7,549,334 B2 * | 6/2009 | Cardarelli .................. 73/504.13 |
| 7,900,518 B2 * | 3/2011 | Tai et al. ......................... 73/754 |

OTHER PUBLICATIONS

Garrett Mar. 6, 1946 Court of Customs and Patent Appeals Application of Hutchison, Patent Appeal No. 5123.

Daniel A. Pruzan Pressure-Sensor Assembly Technique Jan. 2003 NASA Tech Briefs.

* cited by examiner

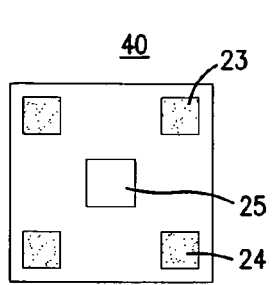
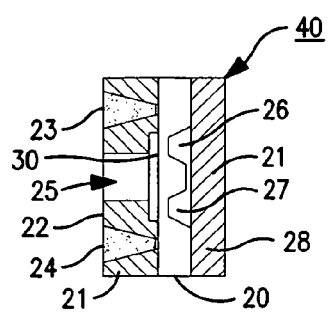
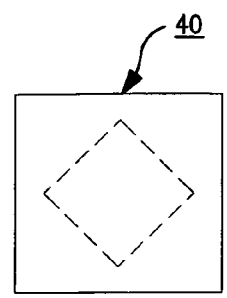
FIG. 1A　　　FIG. 1B　　　FIG. 1C
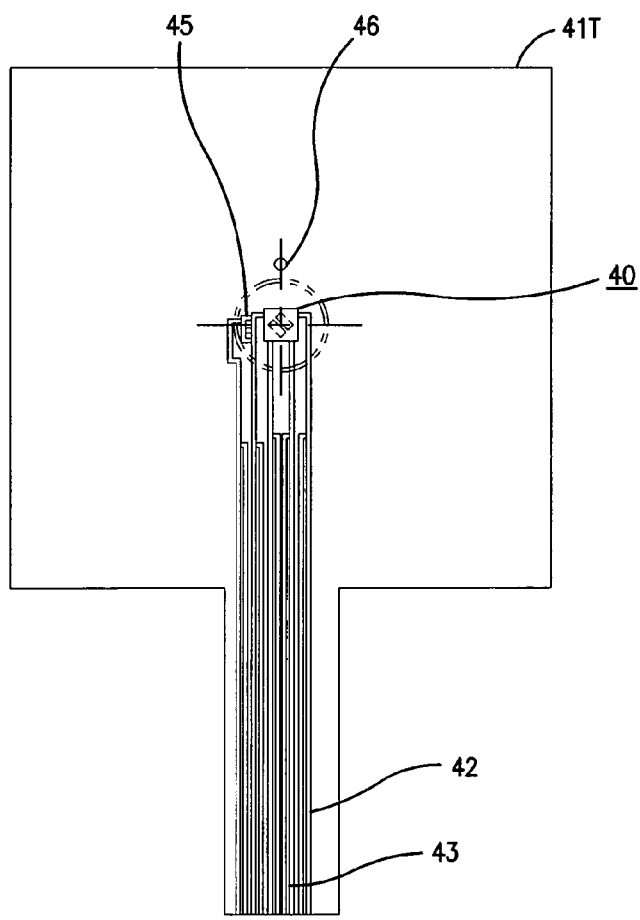
FIG. 2A

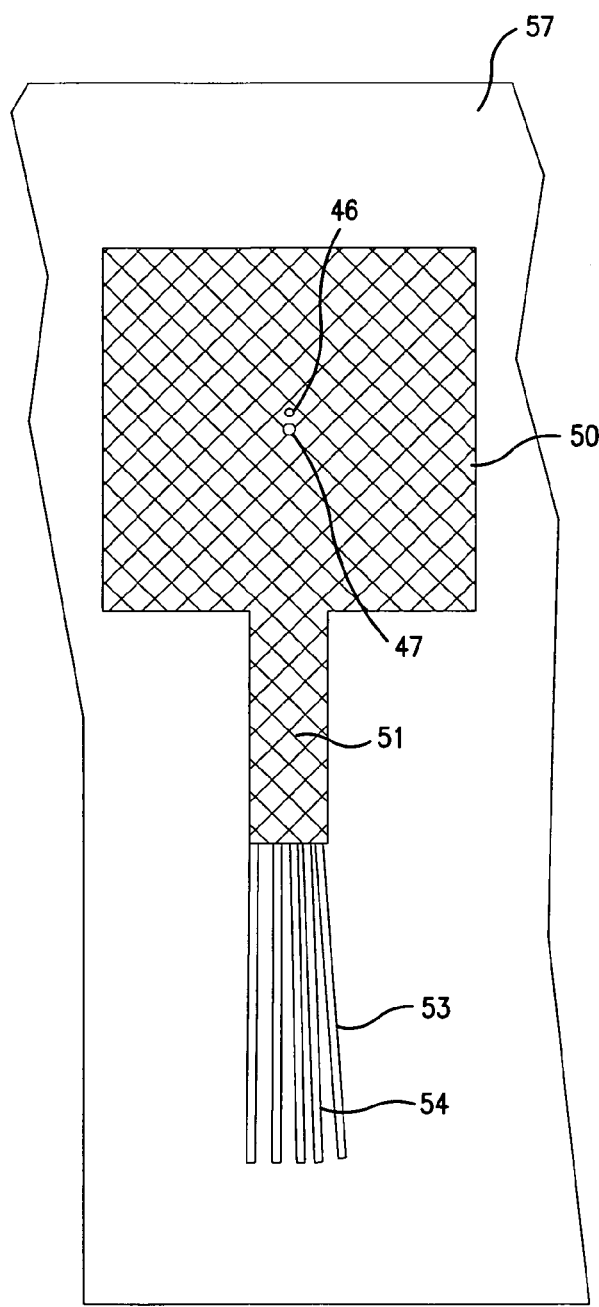
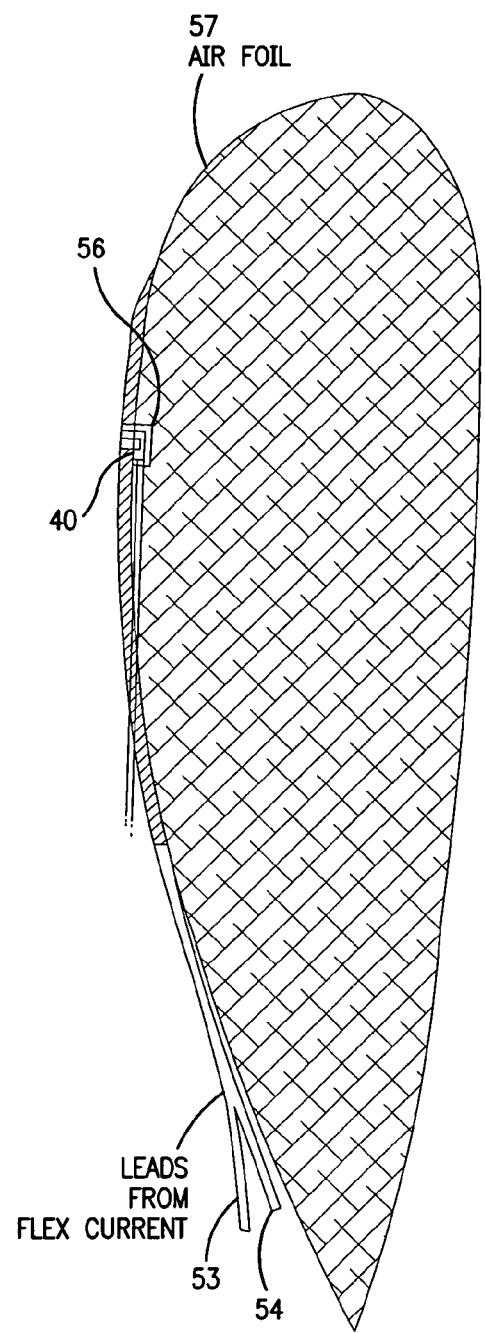
FIG. 3A
FIG. 3B

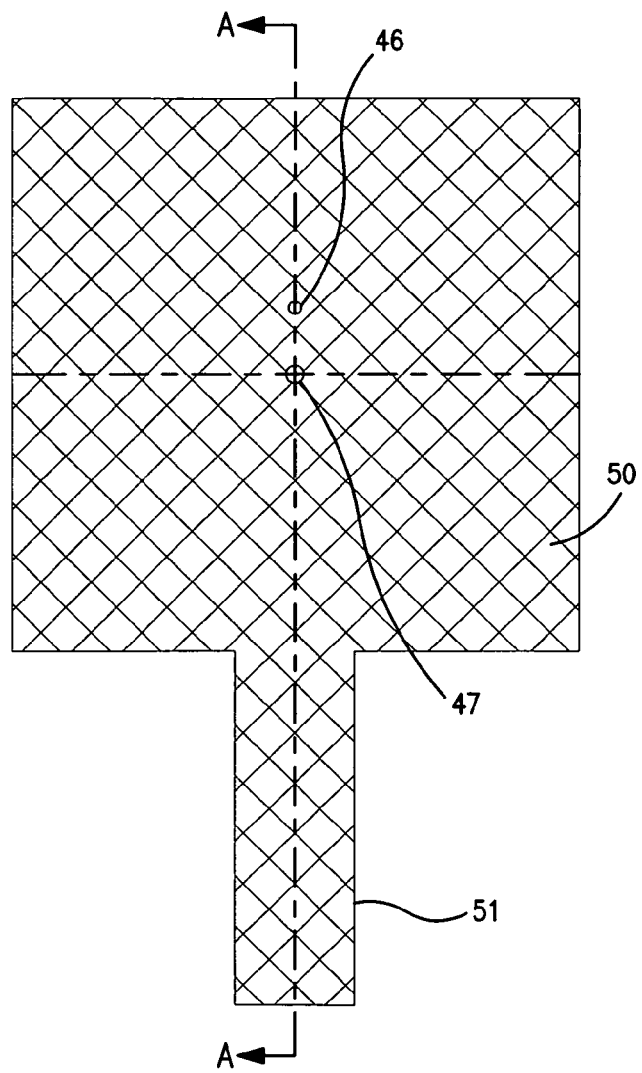 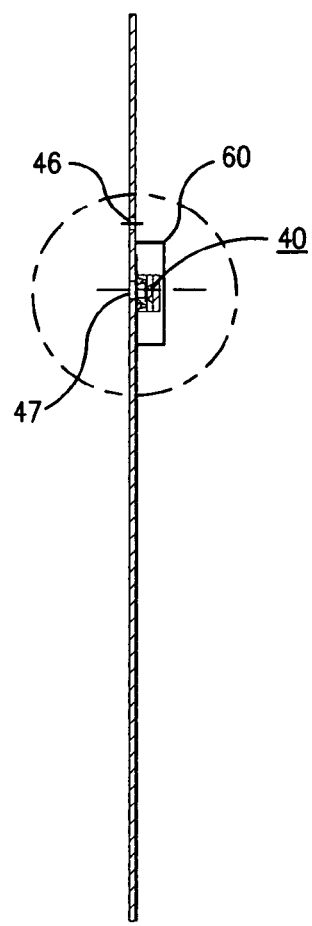
FIG. 5A  FIG. 5B

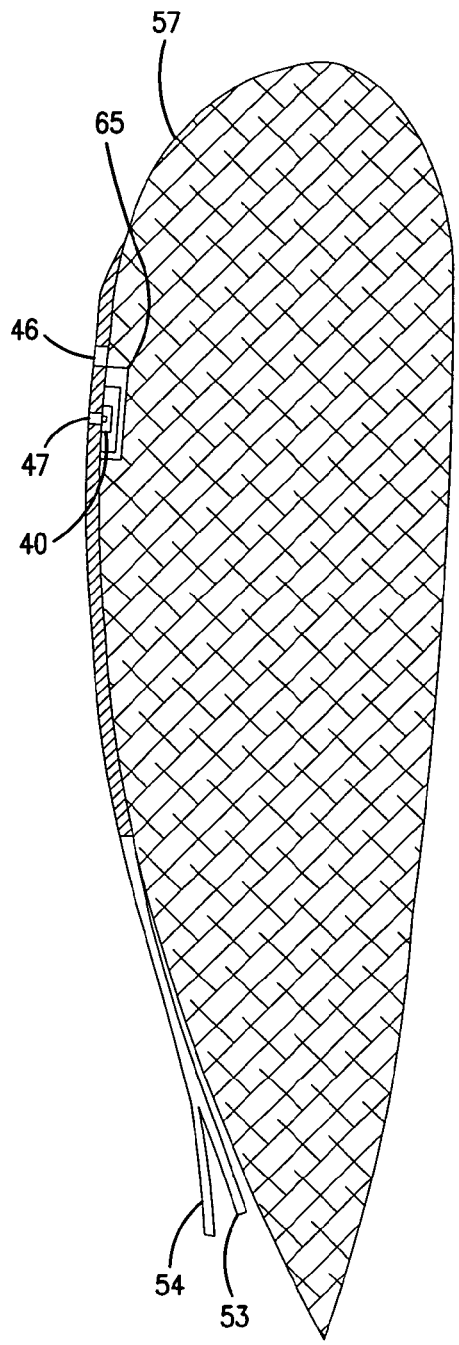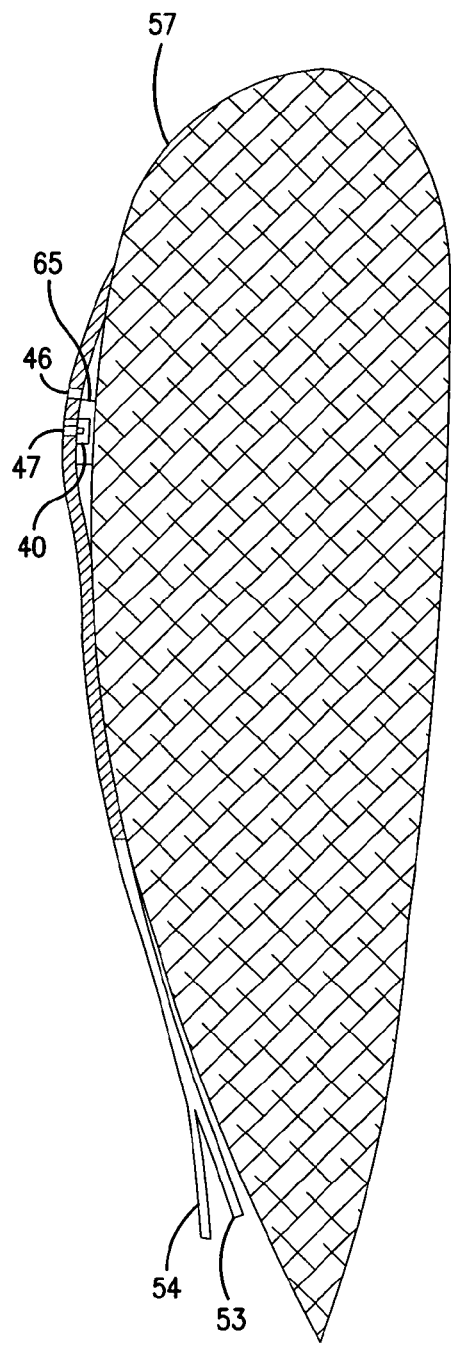
FIG. 7  FIG. 8

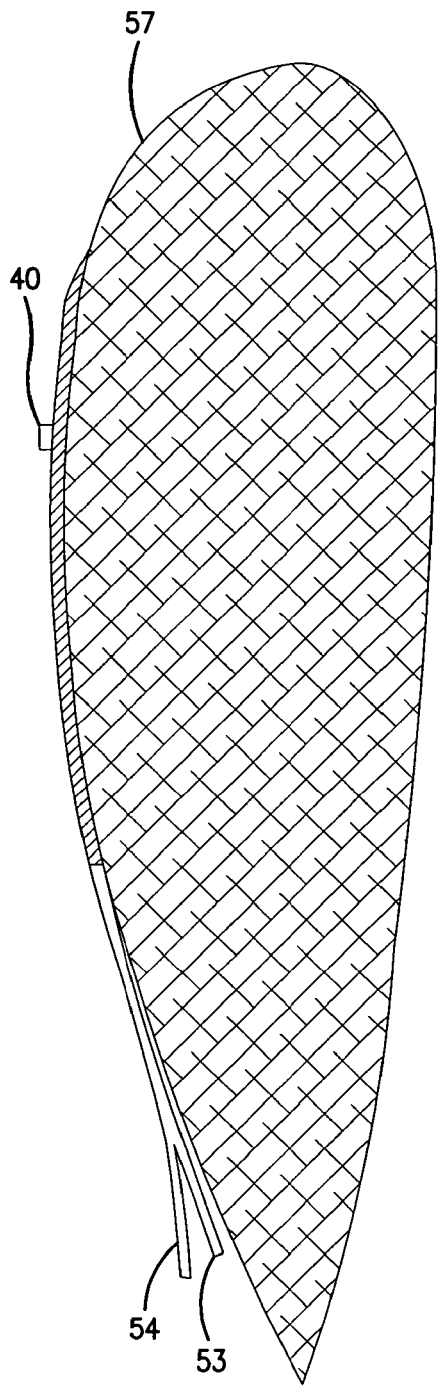
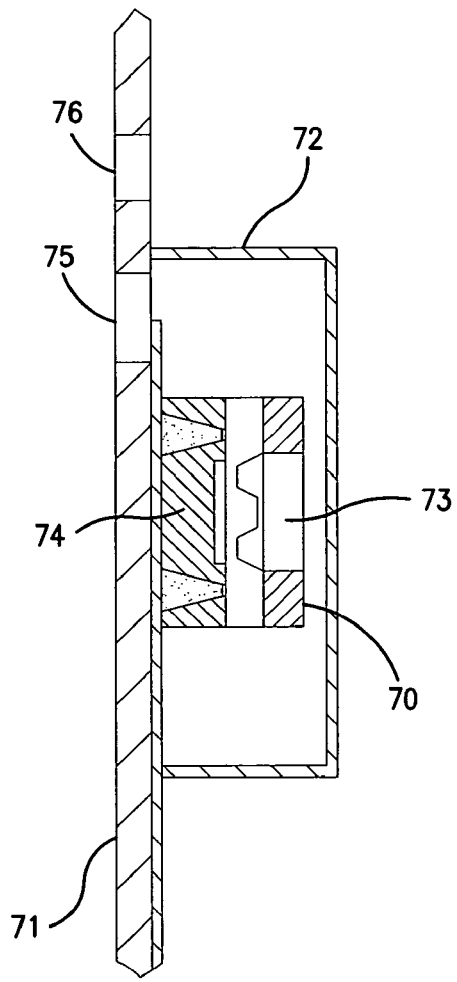
FIG. 9
FIG. 10

PRESSURE TRANSDUCER STRUCTURES HAVING A PLURALITY OF CONDUCTIVE TRACES FOR CURVED SURFACES

CROSS-REFERENCE TO RELATED APPLICATION

This is a continuation application claiming priority to co-pending U.S. patent application Ser. No. 12/291,870, filed on Nov. 14, 2008, which is hereby incorporated by reference in its entirety as if fully set forth herein.

FIELD OF THE INVENTION

This invention relates to pressure transducers and more particularly to a flexible transducer structure suitable for non-intrusively attaching to a curved surface.

BACKGROUND OF THE INVENTION

As one can ascertain, semiconductor pressure transducers are widely used in many applications. Certain of these applications involve placing a transducer on a surface which is curved. Such a surface, for example, may be the leading edge of an aircraft wing or the front of an automobile or vehicle. Such tests may be performed in wind tunnels whereby the effects of airflow past the object can be determined. In any event, by placing the pressure transducer on the object which is held still in moving air, one can obtain pressure measurements in an easy and simple manner. As one can ascertain, pressure transducers in the prior art are while mounted on curved surfaces, would adversely affect airflow, as will be further explained. It is an object of the present invention to provide a pressure transducer which is flexible and which can be attached to a curved surface of an aircraft wing or some other curved surface while providing minimal disturbance to air flow patterns, as for example, as measured in a wind tunnel or some other environment. As will be explained, the structure is thin and flexible enough so that it can be easily attached to a variety of bent/contoured surfaces without disturbing the airflow patterns above these measuring surfaces. As will be further explained, because of the construction the transducer is moisture resistant over a wide variety of atmospheric conditions. As one will ascertain, the assignee herein, namely Kulite Semiconductor Inc., has provided many transducers which have been utilized in all sorts of environments. The applicant herein particularly has provided a ultra thin piezoresistive leadless sensor. These sensors are made of silicon and have been widely employed. For example of such devices, reference is made to U.S. Pat. No. 5,955,771 entitled Sensors for Use in High-Vibrational Applications and Methods for Fabricating the Same to A. D. Kurtz, et al. and issued on Sep. 21, 1999. Reference is also made to U.S. Pat. No. 5,973,590 entitled Ultra Thin Surface Mount Wafer Sensor Structures and Methods for Fabricating the Same issued on Oct. 26, 1999 to A D. Kurtz, et al. and assigned to Kulite Semiconductor Products Inc, the assignee herein. Both patents are incorporated herein in their entirety. As will be explained, the leadless device as indicated and described in both patents, is employed together with a flexible circuit to be described which will enable one to have a flexible transducer structure suitable for mounting to a curved surface and without disturbing airflow patterns.

SUMMARY OF THE INVENTION

A pressure transducer, comprising a thin flexible insulator sheet having a top and bottom surface, and having a plurality of metal traces emanating from a first location on said sheet to a second location, said traces arranged to accommodate contact terminals at said first location, a leadless sensor having contacts configured to be accommodated by said traces whereby said sensor is positioned on said sheet at said first location.

BRIEF DESCRIPTION OF THE DRAWINGS

FIG. 1A illustrates a bottom view of a leadless sensor employed in this invention.

FIG. 1B is a cross-sectional view of a leadless sensor of FIG. 1A.

FIG. 1C is a top view of the leadless sensor.

FIG. 2A is a top view of the leadless sensor secured to a thin flexible insulating sheet such as Kapton according to this invention.

FIG. 3A is a top view showing a sensor mounted to a curved surface.

FIG. 3B is a cross sectional view of FIG. 3A showing the sensor mounted to a air foil and positioned in a recess.

FIG. 4A is a top view depicting another configuration of the sensor while

FIG. 5A is a top view of the sensor while FIG. 5B is cross sectional view showing a sensor together with a cover member.

FIG. 7 is a cross sectional view of an alternate embodiment of a sensor mounted in a recess.

FIG. 8 is a cross sectional view showing the sensor mounted directly on the curved surface.

FIG. 9 is a cross sectional view showing a sensor mounted on a flexible circuit.

FIG. 10 is an enlarged view depicting an alternate type of sensor in conjunction with a flexible circuit.

DETAILED DESCRIPTION OF THE INVENTION

Figure 2B:
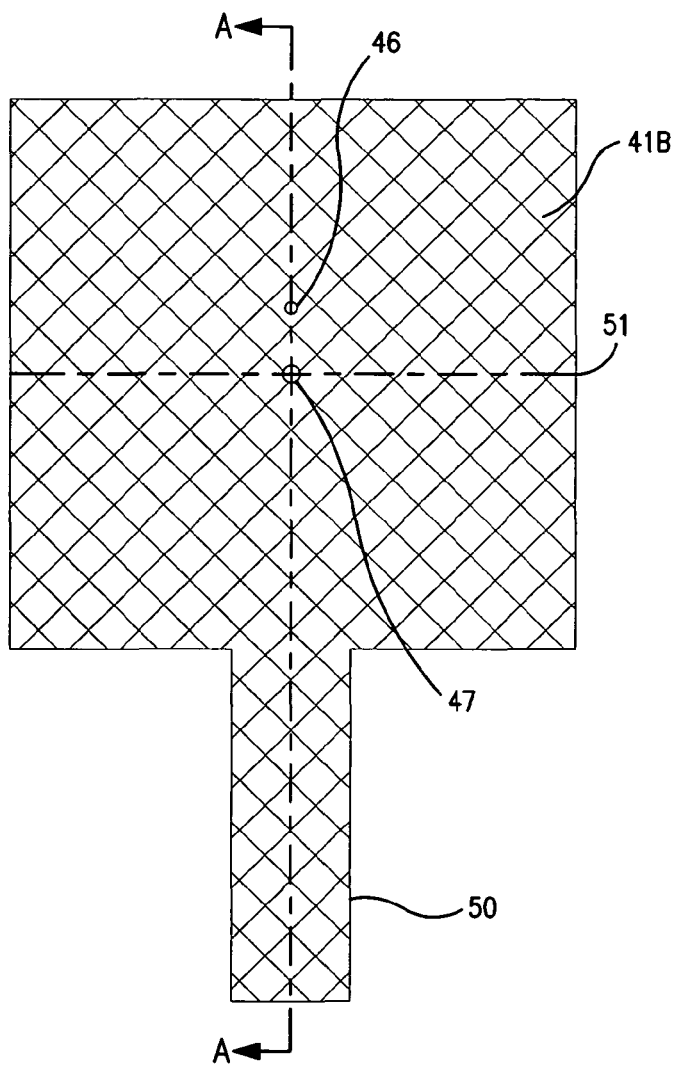
FIG. 2B is a bottom view of the sensor shown in FIG. 2A.

Referring to FIG. 1, as one can ascertain, FIG. 1 consists of 1A, 1B and 1C. FIG. 1A is a bottom view of a leadless sensor according to the teachings of this invention. FIG. 1B is a side cross-sectional view of the sensor of FIG. 1A. FIG. 1C is a top-view of the sensor depicted in FIGS. 1A and 1B. In any event, the sensor as shown FIG. 1 is well known and is basically supplied by the assignee herein and designated as a leadless device. As one can ascertain from FIG. 1B, the sensor contains a central layer or substrate of silicon 20 which is processed to include piezoresistors, the silicon layer 20, as indicated has piezoresistors as 30 formed within active areas as designated by numerals 26 and 27. The active areas are thin and constitute diaphragm areas which will deflect upon application of a force via the port 25. As seen, the silicon layer 20 has bonded thereto a glass cover wafer 28, which glass cover wafer enables one to provide a hermetic seal. Bonded to the other side of the silicon layer 20 is a contact glass wafer or layer 29. The contact glass layer has apertures such as 23 and 24 which communicate with contacts on the silicon layer 20. The apertures as 23 and 24 are filled with a conductive glass frit to enable contacts to be made with the piezoresistive sensors or Wheatstone bridge configurations formed on the semiconductor layer 20. As seen in FIG. 1A, the contacts, as for example, 23 and 24 are brought to the bottom surface which has the pressure port 25 located therein. As seen from FIG. 1C, the sensor configuration is shown with FIG. 1C in the top view with the dash lines indicating the active area of the silicon chip 20. While the sensor has a cover and pressure is applied via port 25, it is well known that there are many other configurations for such sensors. In any event, in regard to the above-noted description of FIG. 1 reference is again made to U.S. Pat. No. 5,973,590 and particular reference is made to FIGS. 6 and 7 which shows such a configuration. It is of course again indicated that the above noted patent describes in detail the structure as well as the methods of forming the same. And as indicated above, the entire Patent is incorporated herein by reference. Reference is also made to the above-noted U.S. Pat. No. 5,955,771 which is also incorporated herein in its entirety. That patent shows various configurations employed with sensors as shown in FIG. 1 including the sensor mounted in a suitable header as its normal use. As will be understood herein, the sensor depicted in FIG. 1 is not mounted in the header but is, as seen, will be mounted in conjunction with the flex circuit configuration. As depicted herein, the leadless chip shown in FIG. 1 basically depicts an absolute chip but is also known that other sensors can be employed with this invention as well, such as differential sensors and so on. All these configurations are known in the art. The absolute sensor, depicted in FIG. 1, is less than a millimeter in thickness and approximately several millimeters in length and width. Thus, as seen, the chip is extremely small.

Figure 2C:
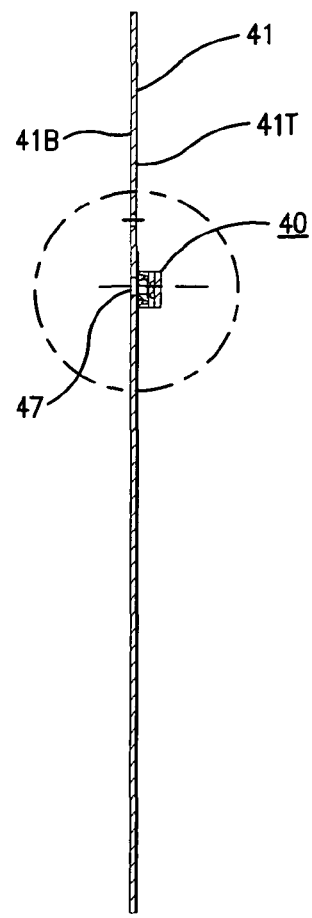
FIG. 2C is sectional view taken through line A-A of FIG. 2B.
Figure 2D:
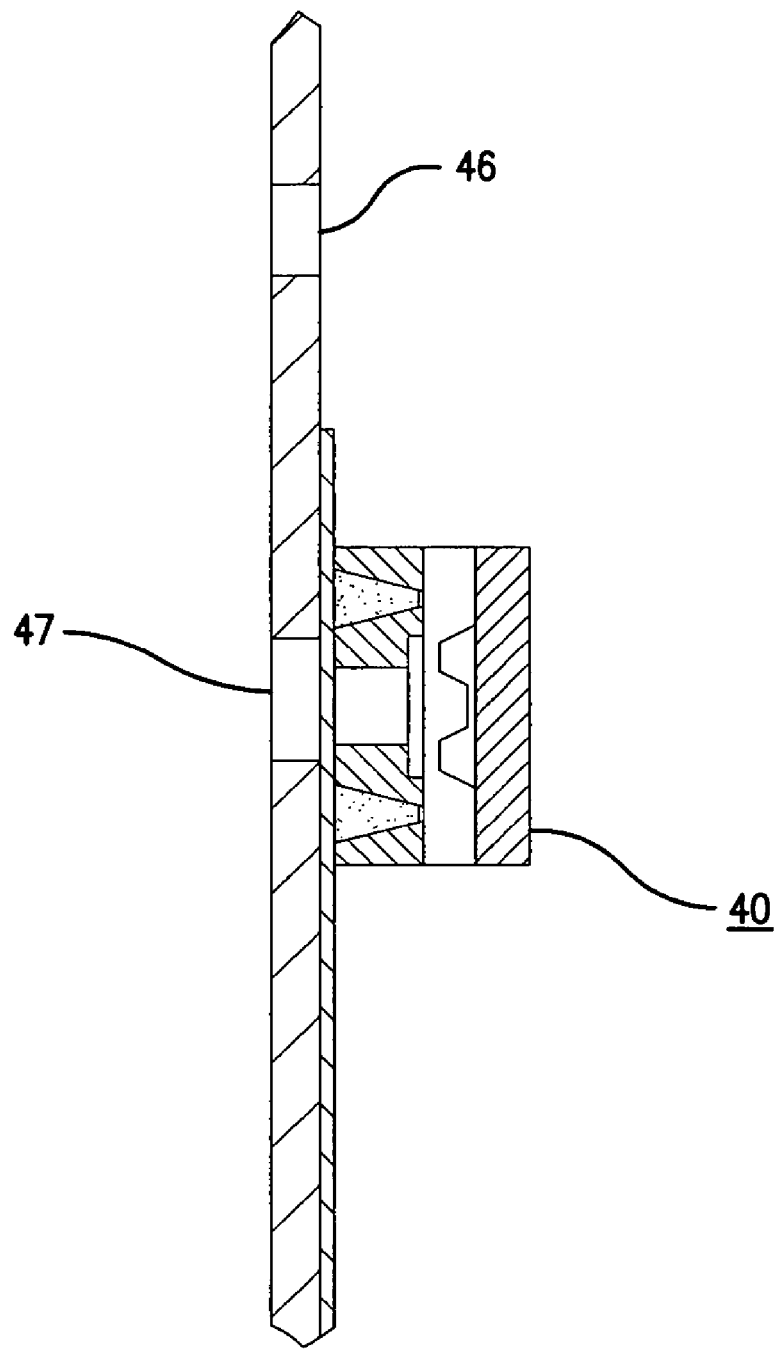
FIG. 2D is an enlarged cross sectional view showing the sensor secured to a thin plastic flexible layer.

As seen in FIG. 2A, the leadless sensor 40 which is for example, a sensor depicted in FIG. 1, is placed at the center of a thin Kapton sheet or Kapton flex sheet 41. The Kapton flex sheet has deposited or formed thereon metalized traces or metalized contacts paths as 42 and 43. These contacts or paths are formed by typical printed circuit techniques as by photolithography or other well known techniques. The contacts from the semiconductor sensor 40, as for example shown in FIG. 1 are placed on suitable contact areas associated with the Kapton flex circuit or sheet 41. There can also be additional components deposited thereon such as span resistor 45 and so on. As seen, the Kapton flex circuit or sheet also has vent hole 46. Thus the semiconductor sensor 40 is placed on the Kapton sheet as shown in FIG. 2A. In FIG. 2B there is shown a bottom view of the Kapton sheet 41. The bottom view is called 41B as compared to the top view as shown in FIG. 2A which is 41P. As seen from the bottom view, there is the thin sheet of Kapton which has the vent hole 46 and has a pressure inlet port 47. The inlet port communicates directly with the semiconductor sensor and essentially is equivalent to port 25 shown in FIG. 1. Thus the sensor can receive a pressure at the inlet port. Referring to FIG. 2C there is shown a cross-sectional view taken through line A-A of FIG. 2B. Thus in FIG. 2C, one can see the sensor is mounted directly on the thin Kapton sheet 41 which has a bottom surface 41B and a top surface 41T. The sensor 40 communicates with the pressure inlet aperture 47. The vent hole is approximately 0.02 inches in diameter while the Kapton sheet is 0.002 inches thick. Thus as indicated, this is extremely small. As one can see, the configuration of FIG. 2B basically shows a rectangular top sheet area 51 which is co-extensive with a trace section 50. The top section 51 is a square configuration but can be of any other geometric configuration. Referring to FIG. 2D there is shown an enlarged view of the vent hole 46, the pressure inlet port 47 and the leadless sensor 40. Thus one can really ascertain from FIG. 2D how the sensor is mounted to the Kapton sheet. The sensor can be mounted to the Kapton sheet by means of any type of bond including an epoxy, glue or some other convenient bond and therefore makes for easy mounting of the sensor on the flexible and thin Kapton sheet. There can be a second layer or sheet of Kapton 48 secured to layer or sheet 41. The sheets 41 and 48 sandwich the conductive traces between them and therefore protect them. However, only a single sheet 41 can be used with the traces coated with an insulated layer with an insulating layer such as a plastic, varnish and so on.

Referring to FIG. 3, there is shown a FIG. 3A a top view of the flexible transducer mounted on an air foil 57. The air foil 57 is a curved surface. As seen in FIG. 3A there is shown the vent hole 46, the pressure port 47 as well as the top section of the flexible transducer 50 and the bottom handle section 51. Wires such as 53 and 54 are connected to the copper or metalized traces such as traces 42 and 43 of FIG. 2A. The wires are brought out to suitable monitoring circuit. Seen in FIG. 3B is the curved surface of the air foil 57. The air foil 57 has a cavity or recess depicted therein or a recess 56. The semiconductor sensor 40 sits into this recess 56 and hence the flexible circuit, when secured or mounted to the air foil by means of a suitable epoxy or other type bond, has the same exact contour as the air foil while the pressure sensor 40 mounted in the recess does not in any manner effect the shape of the air foil. So as indicated, the structure depicted is capable of being bent around a leading edge of wing or air foil with a radius of curvature of 10 or more inches and the structure makes it moisture resistant. In a typical mounting installation, the recess 56 is introduced into the measurement surface enabling the transducer 40 to be flush mounted. The recess 56 is large enough to accept the sensing element. In this way, as depicted in FIG. 3B, there is substantially no flow disturbance provided by the transducer during typical measurement. It is also obvious, that it is part of such flush mount installation, the cavity can be eliminated and a flexible transducer can be mounted directly on the installation surface.

Figure 4A:
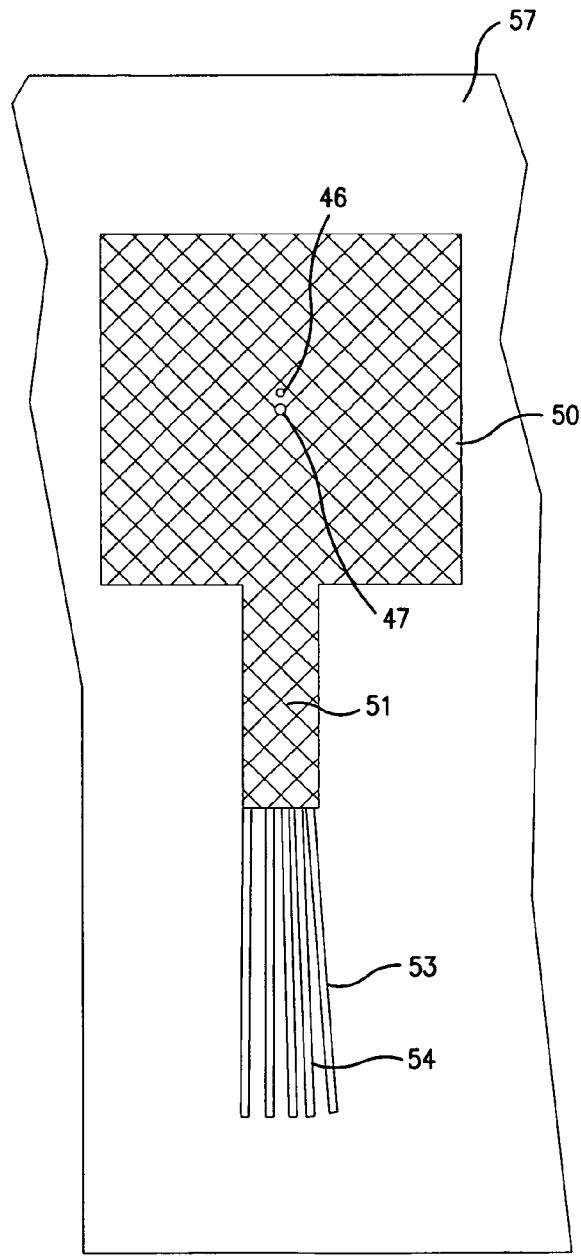
Figure 4B:
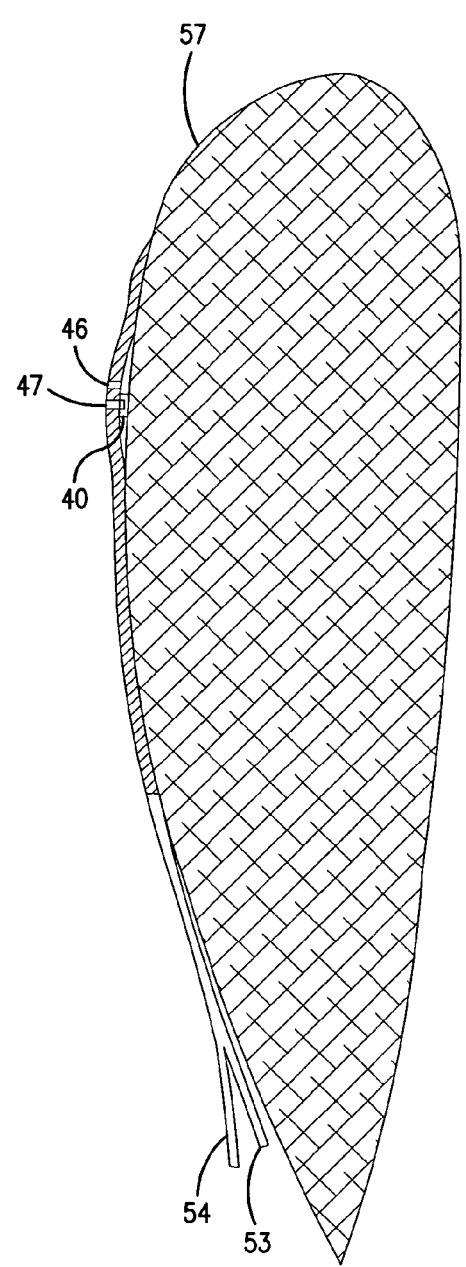
FIG. 4B is a cross sectional view showing the sensor mounted on an air foil without a recess.

Referring to FIG. 4 where the same reference numerals have been used to depict the air foil 57 and the flexible transducer having a top section 50 and a bottom section 51. As one can see in FIG. 4B, the device now is mounted directly on the curved surface of the air foil 57. The flexible transducer structure bends at this area, but the pressure port 47 directly communicates with the sensor 40 as well as the vent hole. The leads from the flexible circuit 53 and 54 are then directed out as connected to the metal traces of the flexible circuit. As seen in FIG. 4, this approach significantly simplifies the installation process while extending the flexible circuit by only a few tenths of mils into the air flow. By eliminating the cavity, the mounting surfaces will not need to be machined or prepped in any way, thus avoiding any possible damage to these measurements.

Referring to FIG. 5, there is shown the same view of the sensor in FIG. 5A with the cover member 60 enclosing the sensor 40. In this manner, the cover member protects the sensor chip during installation by insuring that the chip is covered and kept apart from any glue or epoxy lines. The cover 60 also acts to seal off the back of the sensor and of the entire mounting area from the pressure media. A pressure inlet hole is introduced in the flex circuit to enable application of pressure to the sensor. A vent hole, as shown in FIG. 5A is also again used to enable the venting of any potential cavity formed around the cover during installation. The vent hole is located next to the sensing chip and is outside the footprint of the cover as shown, for example, in FIG. 5B where vent hole 46 is outside the cover with pressure port 47 communicating with the cover.

Figure 6:
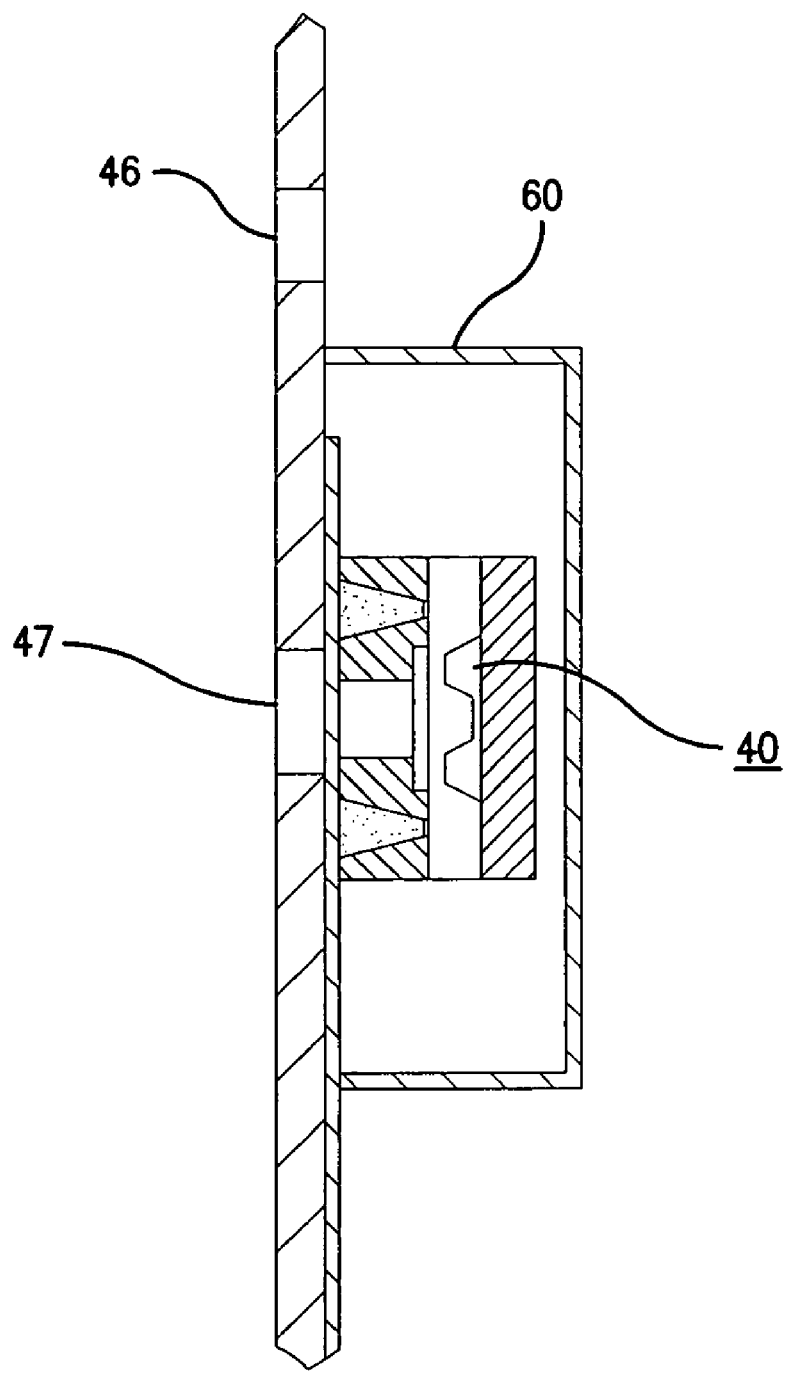
FIG. 6 is an enlarged view of the sensor configuration depicted in FIG. 5B.

Reference is made to FIG. 6 this is more clearly shown where the vent hole 46 is outside the cover 60 with the cover 60 enclosing the semiconductor chip 40 and with the semiconductor chip communicating with the pressure inlet port 47. It is also known that while the Kapton layer is extremely thin, as for example 0.002 inches thick, it can be stiffened by a adding a nickel plated copper layer on top of the Kapton layer, that this will enable the flexible circuit to act more like a piece of foil rather than a thin plastic film. In any event, it is up to the user to select which type of Kapton he wishes to use. In any event, in using the sensor shown in FIGS. 5 and 6, one can again mount the device to the air foil 47, as shown in FIG. 7.

In FIG. 7 there is a recessed cavity in the air foil, namely cavity 65. The sensor is mounted within the cavity 65 where the sensor and its cover is shown mounted to the air foil.

FIG. 8 of course shows the transducer and its cover mounted directly to the air foil 57 without the use of a recess in the air foil.

As shown in FIG. 9, the modified flexible circuit is shown. In FIG. 9 the sensor chip 40 is fabricated without a hole in the contact glass and will have a hole in the cover glass for enabling pressure application to the micromachined side. This sensing chip is mounted to the flex circuit which again consists of formed copper conductors which may be sandwiched between two films of Kapton, and the holes in the upper Kapton layer permit contacts to be made with the reverse side of the chip. As stated prior, such a structure is capable of being bent around a leading edge of a wing as shown in FIG. 9, with a radius of curvature of ten inches and the makeup of its structure enables it to be moisture resistant. As one can see from FIG. 9, the leadless chip 40 is mounted directly on the top surface of the flexible Kapton member. The chip, as depicted for example in FIG. 1 will have an aperture in the glass cover member 28 while the contact glass will not have an aperture, thus pressure would be applied to the bottom side of the chip via the bottom aperture.

Referring to FIG. 10 there is shown a chip such as FIG. 1B but where the contact glass member 74 has no aperture with an aperture 73 in the cover glass member for communicating with the underside of the chip. There is a pressure inlet port 75 and a vent hole 76. There is shown a cover member 72 which covers the chip and a thin Kapton layer 71 to which the cover member and the chip are glued or secured to. The pressure inlet hole 75 introduced in the flex circuit enables the application of pressure into the cavity formed around the sensor chip by the cover. This inlet hole is located next to the sensing chip and within the footprint of the cover. In this construction, the applied pressure acts on the sensor chip in the exact same manner as in a typical leadless construction described above and shown in the above noted patents U.S. Pat. No. 5,955,771 and U.S. Pat. No. 5,973,590. A vent hole 76 is introduced in the flex circuit to enable the venting of any potential cavity formed around the cover during the installation. The vent hole 76 is located next to the sensing chip and is outside the footprint of the cover. In using such flexible transducer with a cover, the mounting surface can either be prepared with a cavity to accept the cover, as described above, or the cavity can be eliminating and the flex transducer can be directly mounted, as for example depicted above in regard to other transducers. It is thus seen that the above noted structure enables one to utilize ultra thin transducers of the leadless type in regard to flexible circuitry which will enable accurate measurements to be made without basically disturbing air flow. It will be apparent to those skilled in the art that there are many alternate embodiments which can be depicted using the techniques described above and all such alternate embodiments are deemed to be encompassed within the spirit and scope of the invention depicted herein.

The invention claimed is:

1. A pressure transducer assembly, comprising:
a flexible sheet having a first layer;
a plurality of conductive traces disposed on the first layer of the flexible sheet, extending from a first location on the flexible sheet to a second location on the flexible sheet; and
a sensor attached to the flexible sheet and in electrical communication with the plurality of conductive traces, wherein the sensor is adapted to measure an incoming air pressure directly applied to the sensor.

2. The pressure transducer assembly of claim 1, further comprising a pressure inlet port defined through the flexible sheet and aligned with the sensor, wherein the pressure inlet port receives the incoming air pressure and directly applies the incoming air pressure to the sensor.

3. The pressure transducer assembly of claim 1, further comprising a vent hole defined within the flexible sheet.

4. The pressure transducer assembly of claim 3, wherein the vent hole is about 0.02 inches in diameter.

5. The pressure transducer assembly of claim 1, wherein the flexible sheet is fabricated from a Kapton material.

6. The pressure transducer assembly of claim 1, wherein the flexible sheet is about 0.002 inches in thickness.

7. The pressure transducer assembly of claim 1, wherein the conductive traces are copper conductors.

8. The pressure transducer assembly of claim 1, wherein the conductive traces are coated with an insulating layer.

9. The pressure transducer assembly of claim 1, wherein the sensor is a silicon piezoresistive sensor.

10. The pressure transducer assembly of claim 1, wherein the sensor is attached to the flexible sheet with epoxy, glue, or combinations thereof.

11. The pressure transducer assembly of claim 1, further comprising a cover member enclosing the sensor and adapted to shield the sensor from external environments.

12. The pressure transducer assembly of claim 1, further comprising a nickel plated copper layer deposited on the top surface of the flexible sheet to stiffen the flexible sheet.

13. A pressure transducer assembly, comprising:
a flexible sheet having a first layer and a second layer;
a plurality of conductive traces disposed between the first and second layers, extending from a first location to a second location; and
a sensor attached to the flexible sheet and in electrical communication with the plurality of conductive traces, wherein the sensor is adapted to measure an incoming air pressure directly applied to the sensor.

14. The pressure transducer assembly of claim 13, further comprising a pressure inlet port defined through the flexible sheet and aligned with the sensor, wherein the pressure inlet port receives the incoming air pressure and directly applies the incoming air pressure to the sensor.

15. The pressure transducer assembly of claim 13, further comprising a vent hole defined within the flexible sheet.

16. The pressure transducer assembly of claim 15, wherein the vent hole is about 0.02 inches in diameter.

17. The pressure transducer assembly of claim 13, wherein the flexible sheet is fabricated from a Kapton material.

18. The pressure transducer assembly of claim 13, wherein the flexible sheet is about 0.002 inches in thickness.

19. The pressure transducer assembly of claim 13, wherein the conductive traces are copper conductors.

20. The pressure transducer assembly of claim 13, wherein the conductive traces are coated with an insulating layer.

* * * * *